(12) United States Patent
Yukiyoshi

(10) Patent No.: US 7,405,772 B2
(45) Date of Patent: Jul. 29, 2008

(54) BROADCASTING RECEIVER

(75) Inventor: Ryohaku Yukiyoshi, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 478 days.

(21) Appl. No.: 10/950,468

(22) Filed: Sep. 28, 2004

(65) Prior Publication Data

US 2005/0073614 A1    Apr. 7, 2005

(30) Foreign Application Priority Data

Oct. 2, 2003    (JP) ............................. 2003-344739

(51) Int. Cl.
  *H04N 5/50* (2006.01)
  *H04N 7/16* (2006.01)
  *H04B 1/18* (2006.01)

(52) U.S. Cl. .................. 348/732; 348/725; 348/731; 348/570; 725/151; 455/185.1; 455/168.1

(58) Field of Classification Search ................ 348/725, 348/726, 731, 732, 569, 570; 725/68, 151
  See application file for complete search history.

(56) References Cited

U.S. PATENT DOCUMENTS

| | | | | |
|---|---|---|---|---|
| 6,061,096 A * | 5/2000 | Limberg | ...................... | 348/555 |
| 6,359,580 B1 * | 3/2002 | Morrison | ...................... | 348/731 |
| 6,483,553 B1 * | 11/2002 | Jung | ........................... | 348/731 |
| 6,525,779 B1 * | 2/2003 | Sakakibara et al. | ......... | 348/558 |
| 6,545,723 B1 * | 4/2003 | Han | ............................. | 348/555 |
| 6,622,308 B1 * | 9/2003 | Raiser | ........................ | 725/151 |
| 6,721,018 B1 * | 4/2004 | Shintani et al. | ............. | 348/731 |
| 6,888,576 B2 * | 5/2005 | Takagi et al. | ................. | 348/569 |
| 6,963,623 B2 * | 11/2005 | Ninomiya et al. | ........... | 375/326 |
| 7,016,435 B2 * | 3/2006 | Adachi | ....................... | 375/345 |
| 7,030,933 B2 * | 4/2006 | Takagi et al. | ................ | 348/569 |
| 7,050,117 B2 * | 5/2006 | Takagi et al. | ................ | 348/725 |
| 7,061,542 B1 * | 6/2006 | Ikeguchi | ..................... | 348/558 |

(Continued)

FOREIGN PATENT DOCUMENTS

JP    2001-230689    8/2001

(Continued)

OTHER PUBLICATIONS

Office Action mailed May 7, 2008 in Corresponding Japanes Patent Application No. 2003-344739.

*Primary Examiner*—Brian P Yenke
(74) *Attorney, Agent, or Firm*—Westerman, Hattori, Daniels & Adrian, LLP.

(57) ABSTRACT

Single processing of the first channel search using the analog broadcasting tuner enables not only analog broadcasting channel to be detected but also the existence of digital broadcasting channel to be estimated. Furthermore, the acquisition of information transmitted on a digital broadcasting channel can be made apart from the first channel search when the channel is selected (received) or when the second channel search is performed. As a result, the first channel search (overall channel search) can be efficiently completed in a short time. In the second channel search for acquiring the digital broadcasting information, the number of physical channels to be searched is decreased by limiting to the number of the estimated channels. Accordingly, overall channel search which also acquires the digital broadcasting information is efficiently completed in a short time.

11 Claims, 3 Drawing Sheets

U.S. PATENT DOCUMENTS

| | | | | |
|---|---|---|---|---|
| 7,092,044 | B2* | 8/2006 | Inui et al. | 348/732 |
| 2002/0067437 | A1* | 6/2002 | Tsubouchi et al. | 348/725 |
| 2002/0097344 | A1* | 7/2002 | Shibusawa | 348/731 |
| 2003/0067555 | A1* | 4/2003 | Han | 348/558 |
| 2004/0004674 | A1* | 1/2004 | Birleson | 348/731 |

FOREIGN PATENT DOCUMENTS

| | | |
|---|---|---|
| JP | 2002-171453 | 6/2002 |
| JP | 2003-069907 A | 3/2003 |

\* cited by examiner

BROADCASTING RECEIVER

BACKGROUND OF THE INVENTION

Field of the Invention

The present invention relates to a broadcasting receiver capable of receiving both digital broadcasting and analog broadcasting.

A digital broadcasting receiver for receiving digital broadcasting using a satellite or a terrestrial wave selects an arbitrary broadcasting wave out of a plurality of broadcasting waves which are received through a satellite antenna or a terrestrial wave antenna by a digital tuner, and selects an arbitrary channel out of a plurality of channels included in the selected broadcasting wave by demultiplexing processing, and then takes out a digital signal on the selected channel to output a video/audio signal by decoding the digital signal.

A digital and analog broadcasting receiver comprising an analog tuner for receiving conventional analog broadcasting, together with a digital tuner for receiving digital television broadcasting can be configured. In existent station channel search processing in the broadcasting receiver, a technique for shortening the time required to perform channel search by executing search processing on the side of digital tuner and search processing on the side of analog tuner at the same time by the two CPUs is known (see JP-A-2002-171453).

SUMMARY OF THE INVENTION

However, it is desirable that channel searches for analog broadcasting and digital broadcasting are efficiently performed in a short time even if channel searches are carried out by one CPU.

In view of the foregoing circumstances, an object of the present invention is to provide a broadcasting receiver capable of performing channel searches for both analog broadcasting and digital broadcasting efficiently in a short time.

In order to solve an above-mentioned problem, a broadcasting receiver provided with both an analog broadcasting tuner and a digital broadcasting tuner according to the present invention is characterized by comprising means for successively selecting channels in the bands for analog broadcasting and digital broadcasting using the analog broadcasting tuner; means for acquiring an automatic gain controller signal for the selected channel and the existence information on synchronizing signal for the selected channel; means for storing information for channel selection related to a channel on which the synchronizing signal is detected as an analog broadcasting channel in a memory, while storing information for channel selection related to a channel on which the broadcasting wave is detected on the basis of the automatic gain controller signal and the synchronizing signal is not detected as a digital broadcasting channel in the memory.

In the above mentioned configuration, not only the analog broadcasting channel is detected, but also the existence of the digital broadcasting channel is estimated by single channel search processing using the analog broadcasting tuner, and the acquisition of information transmitted on the digital broadcasting channel is made apart from the channel search. As a result, the channel search (overall channel search) can be efficiently completed in a short time.

In the above mentioned broadcasting receiver, it is desirable that the broadcasting receiver comprises means for successively selecting the digital broadcasting channels stored in the memory using the digital broadcasting tuner; means for storing information acquired by receiving each digital broadcasting channel in a memory. In such a configuration, the number of physical channels to be searched is decreased by limiting to the number of the estimated channels. Accordingly, overall channel search processing (which also acquires the transmission information on digital broadcasting) is efficiently completed in a short time.

In these configurations, a message for suggesting a user to successively select the channels in the bands for analog broadcasting and digital broadcasting using the analog broadcasting tuner may be displayed on a screen. The message may be displayed when TV is on. Also, the message may be displayed for each predetermined period.

The broadcasting receiver may be configured that a series of processing is automatically performed for each predetermined period. The series of processing includes such processing as successively selecting channels in the bands for analog broadcasting and digital broadcasting using the analog broadcasting tuner, acquiring an automatic gain controller signal for the selected channel and the existence information on a synchronizing signal for the selected channel, and storing information for channel selection related to a channel on which the synchronizing signal is detected as an analog broadcasting channel in the memory, while storing information for channel selection related to a channel on which the broadcasting wave is detected on the basis of the automatic gain controller signal and the synchronizing signal is not detected as a digital broadcasting channel in the memory.

The broadcasting receiver may be configured that a series of processing is performed even while the analog broadcasting tuner is in operation. The series of processing includes such processing that the digital broadcasting channel stored in the memory is successively selected by the digital broadcasting tuner and information acquired by receiving each digital broadcasting channel is stored in the memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
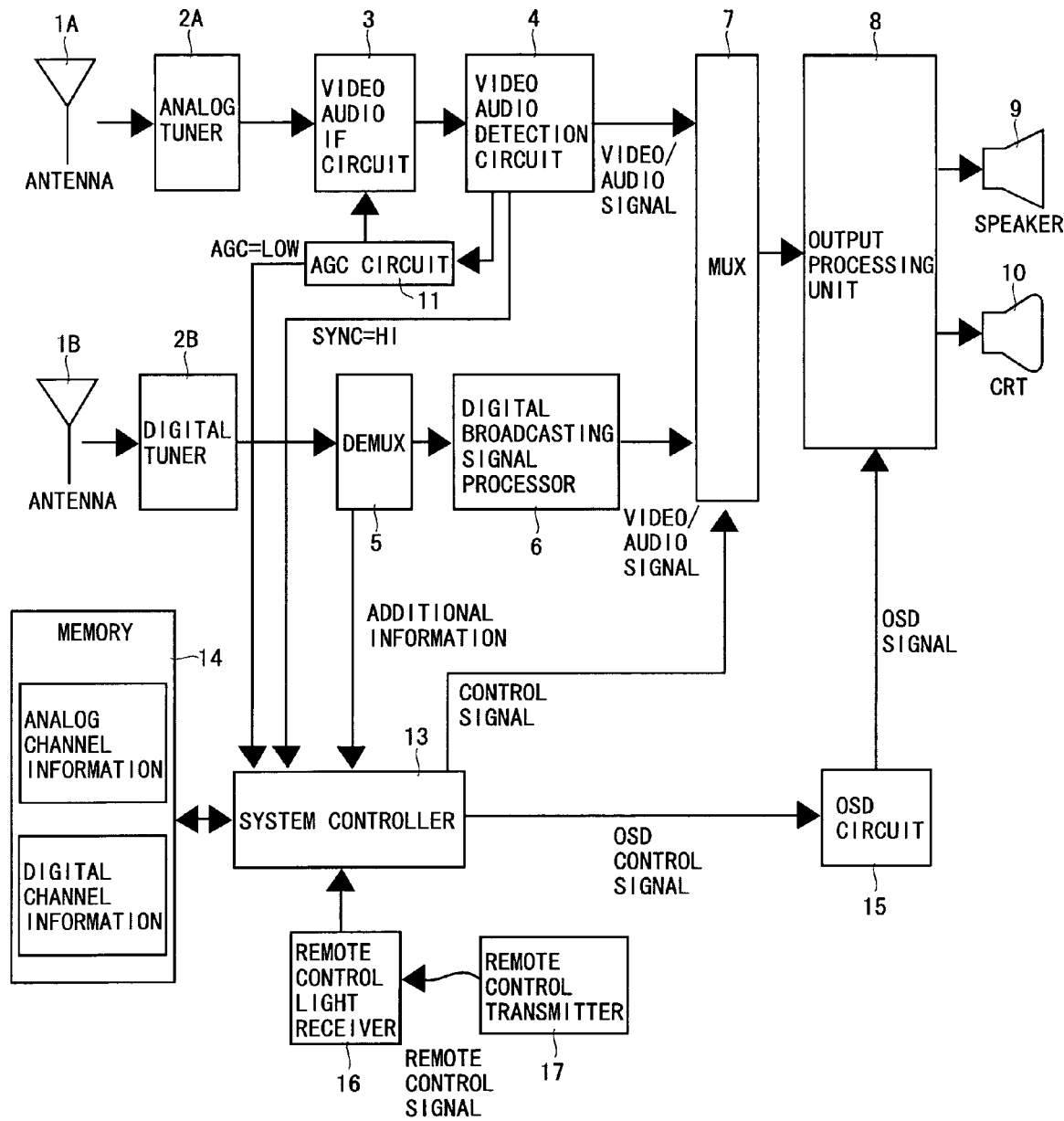
FIG. 1 is a block diagram showing a broadcasting receiver according to an embodiment of the present invention.
Figure 2:
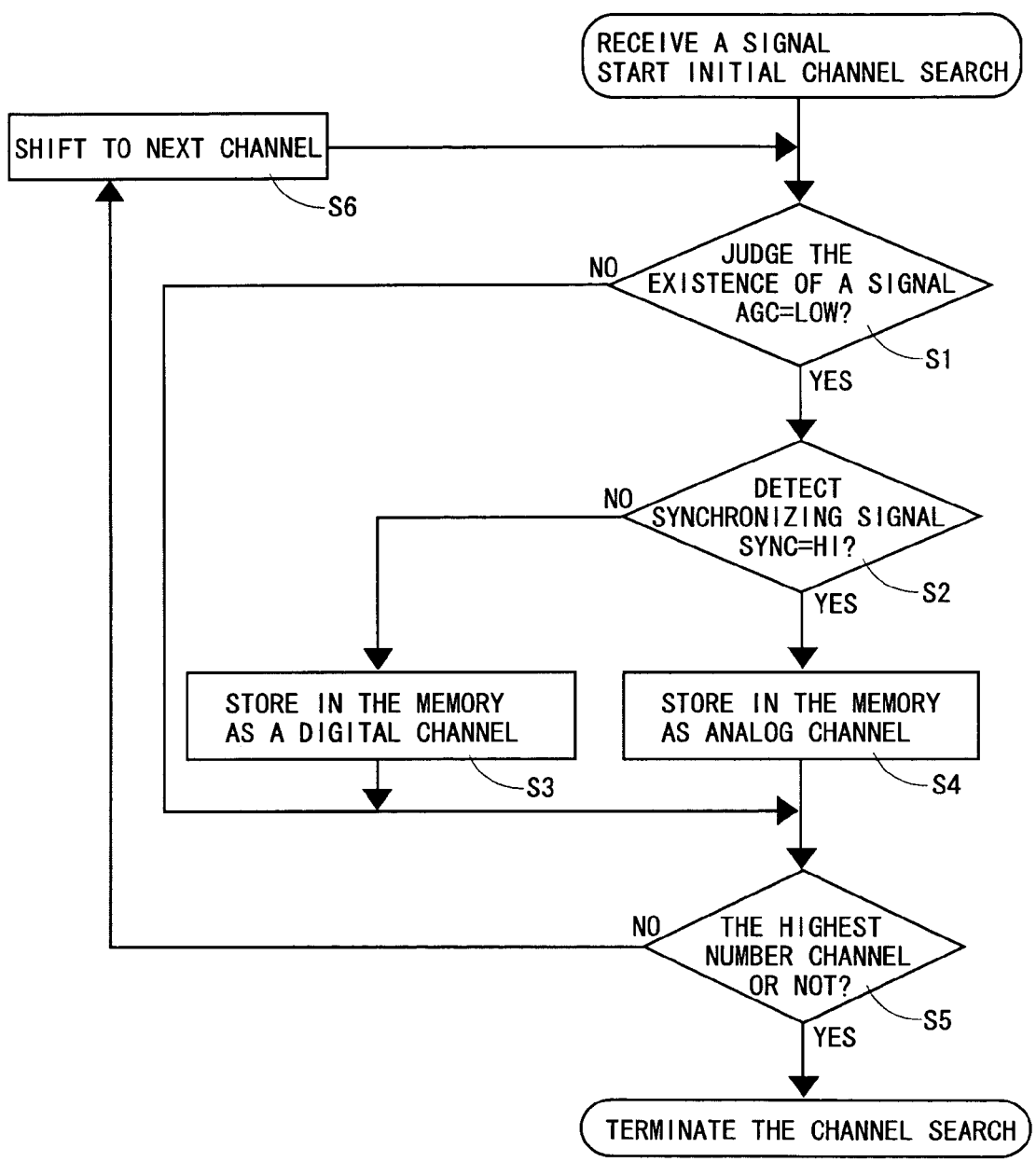
FIG. 2 is a flow chart showing the channel search processing.
Figure 3:
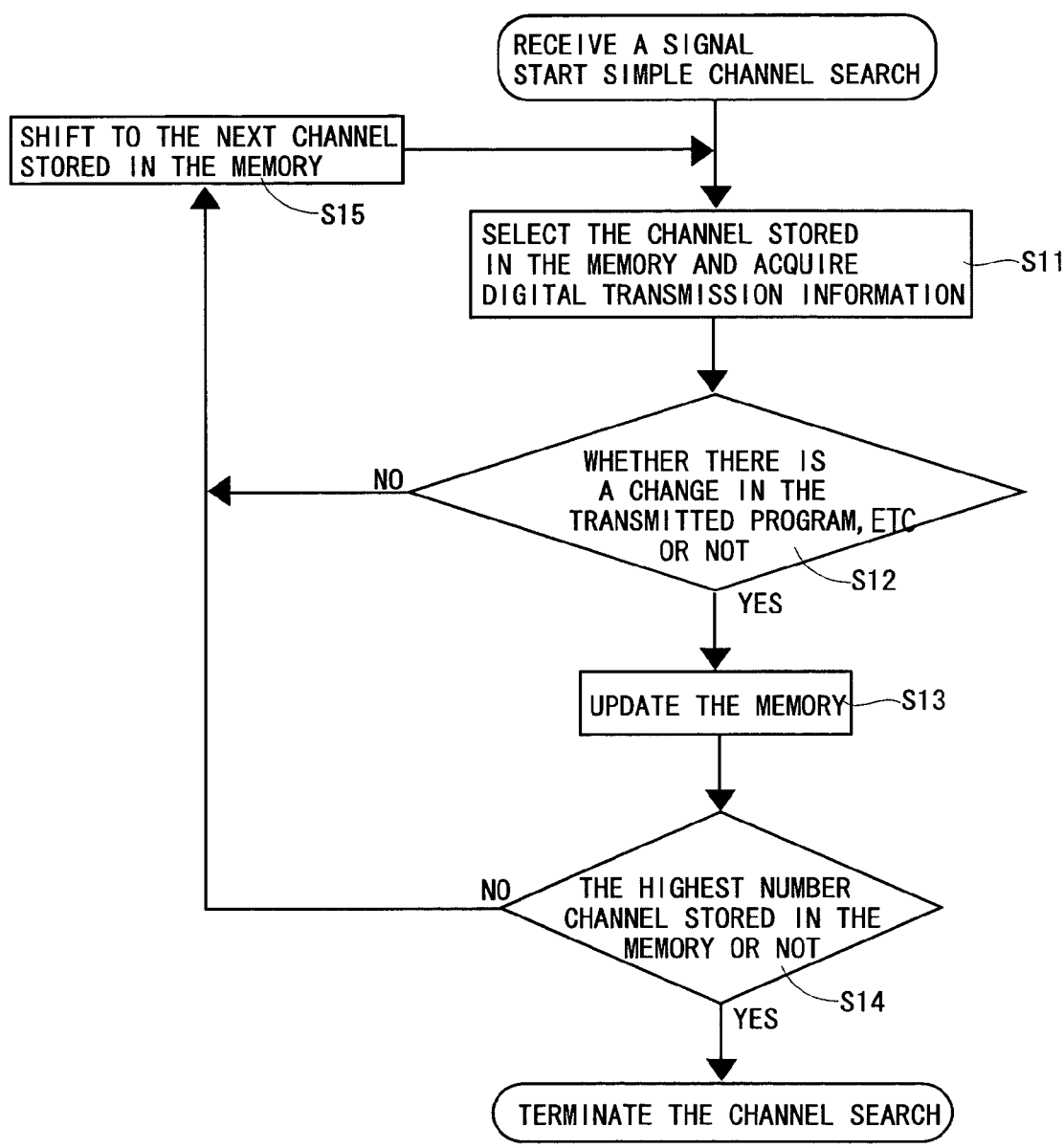
FIG. 3 is a flow chart showing the channel search processing.

An embodiment of the present invention is now described referring to FIGS. 1 to 3.

In FIG. 1, terrestrial wave antennas 1A, 1B are arranged outside in a predetermined direction, and receives a terrestrial broadcasting signal. The terrestrial wave antennas 1A, 1B feed a received signal to tuners 2A, 2B.

The analog tuner 2A selects an RF (high-frequency signal) from the antenna 1A and converts the selected RF into an intermediate frequency (IF). The tuner 2A comprises an early stage amplifier for amplifying the received RF signal, an AGC (Automatic Gain Control) amplifier for making gain variable by a control voltage from the exterior, a mixer for generating an IF signal, or a differential frequency between a local frequency generated by a voltage controlled oscillator and the received RF signal, a PLL (Phase Locked Loop) circuit for controlling the voltage controlled oscillator to a state where a predetermined steady frequency is outputted by data for channel selection (data for tuning) fed from the system controller 13, and the like. An intermediate frequency (IF) circuit 3 comprises an intermediate amplifier and various types of trap circuits, and amplifies the intermediate frequency in a required band out of the signal having intermediate frequencies outputted from the tuner 2A with high gain. A detection circuit (video signal producing circuit) 4 detects a video signal having the amplified intermediate frequency to extract a color television signal (a luminance signal, a chrominance signal, a synchronizing signal), and detects an audio signal having the intermediate frequency. An AGC circuit 11 detects the level of the video signal and feeds an AGC voltage value (set value of the degree of the amplification) to the amplifier in the intermediate frequency circuit 3 (further, feeds it to the tuner 2A) so as to keep the level of the video signal constant. Further, the AGC circuit 11 compares the AGC voltage value with a reference voltage value, and outputs a detection signal (AGC=LOW) representing the existence of broadcasting wave to the system controller 13 when the AGC voltage value is lower than the reference voltage value. In a common system, the higher the received signal level is, the lower the AGC voltage value is. By utilizing above-mentioned characteristics, a comparison voltage is set so as to be concluded that there is no signal (there is no broadcasting wave) when the electric field signal is extremely weak. Furthermore, the detection circuit 4 detects the existence or the absence of a video synchronizing signal, and feeds a detection signal (SYNC=HI) representing the existence of a video synchronizing signal to the system controller 13 when there is a video synchronizing signal. The system controller 13 utilizes the detection signal from the AGC circuit 11 and the detection signal from the detection circuit 4 in executing channel search processing which is described later. The analog tuner 2A, the intermediate frequency circuit 3, and the detection circuit 4 are controlled by the system controller 13 via a bus (e.g. IIC bus, and the like).

The digital tuner 2B is provided with a frequency selection function similar to the analog tuner 2A described above, and also provided with a demodulation circuit, an inverse interleave circuit, and an error correction circuit, and so forth, and demodulates the selected digital modulation signal to output a transport stream.

A demultiplexer (DEMUX) 5 separates the transport stream into a video stream and an audio stream based on MPEG2 (Moving Picture Experts Group2) and PSI/SI (Program Specific Information/Service Information), or the like. The demultiplexer 5 feeds the video stream and the audio stream to a digital broadcasting signal processor 6, and feeds program information or the like included in the PSI/SI to the system controller 13.

The digital broadcasting signal processor 6 is provided with a video decoder for decoding the video stream and an audio decoder for decoding the audio stream. The video decoder decodes an inputted variable-length code to find a quantization factor and a motion vector, to carry out inverse DCT (Discrete Cosine Transformation) and motion compensation control based on the motion vector. The audio decoder decodes a coded signal which has been inputted, to generate audio data. The video data and the audio data generated by the decoding are respectively converted from digital to analog (D/A) to be a video signal and an audio signal.

A multiplexer (MUX) 7 inputs a video/audio signal based on analog broadcasting and a video/audio signal based on digital broadcasting. The multiplexer 7 selects either of the video/audio signals and outputs the selected video/audio signal according to an instruction from the system controller 13.

An output processing unit 8 performs processing such as amplifying a luminance signal in the video signal which are selected and outputted by the multiplexer 7 up to the intensity required to drive a CRT (Cathode-Ray Tube) 10, generating a color sub-carrier, and demodulating a color difference signal from a carrier chrominance signal using the color sub-carrier, and then feeds the processed signal to the CRT 10. The audio signal selected and outputted by the multiplexer 7 is amplified and is supplied to a speaker 9. Further, the output processing unit 8 performs processing for superimposing an OSD signal outputted from an OSD (On-Screen Display) circuit 15, described later, onto the received video signal.

The OSD circuit 15 processes video data based on character information or color information which is instructed to output from the system controller 13, and outputs the processed video data as an OSD signal to the output processing unit 8. The OSD circuit 15 enables a menu screen, various types of setting screens, and the like to be displayed.

A remote control transmitter 17 is provided with various types of keys, and sends out various types of commands to a broadcasting receiver. When the key is operated, signal light (a remote control signal) which means a command corresponding to the operated key is sent from a light emitting unit. A remote control light receiver 16 receives the signal light, converts the signal light into an electric signal, and feeds the electric signal to the system controller 13.

A memory (a RAM, an EEPROM (Electrically Erasable and Programmable ROM), a flash memory, etc.) 14 stores analog channel information (frequency information, information such as a channel list and an enterpriser's name corresponding to a position), digital channel information (frequency information, information such as a channel list and an enterpriser's name corresponding to a remote control key ID), and various types of setting information, etc.

The first channel search processing is now described referring to a flow chart in FIG. 2. The system controller 13, when the power is initially turned on, for example, automatically makes the analog tuner 2A select the lowest frequency out of bands in which terrestrial wave analog broadcasting and terrestrial wave digital broadcasting are transmitted. The system controller 13 judges whether a detection signal "AGC=LOW" is outputted from the AGC circuit 11 (step S1). Output of the detection signal "AGC=LOW" means that there is a strong broadcasting wave on the channel (a physical channel). If the detection signal "AGC=LOW" is not outputted, the procedure proceeds to the step S5. On the other hand, if the detection signal "AGC=LOW" is outputted, the system controller 13 judges whether a detection signal "SYNC=HI" is outputted from the detection circuit 4 (step S2). Output of the detection signal "SYNC=HI" means that received wave is an analog broadcasting wave. When the detection signal "SYNC=HI" is not outputted, the system controller 13 stores the channel as a digital channel in the memory 14 (step S3). When the detection signal "SYNC=HI" is outputted, the system controller 13 stores the channel as an analog channel in the memory 14 (step S4). Then the system controller 13 judges whether the selected channel is the highest number channel or not (step S5). If the selected channel is not the highest number channel, the target will shift to the next channel whose frequency level is higher than the previously selected channel (step S6), and the procedure returns to the step S1. If the selected channel is the highest number channel, the channel search processing is terminated.

The second channel search processing is now described referring to a flow chart in FIG. 3. The target channel in the processing is the digital broadcasting channel stored in the memory 14. The second channel search processing is carried out also at arbitrary times (when the power is turned off, or when the instruction is given from the user, etc) independently from the first channel search processing. The system controller 13 recalls a frequency information of the lowest frequency channel from the memory 14, for example, and makes the digital broadcasting tuner 2B perform the channel selection processing to receive a broadcasting wave and acquire a digital transmission information (step S11). The system controller 13 judges whether information about an enterprise or the like has been changed (step S12), the procedure proceeds to the step S15 in a case where the information has not been changed. On the other hand, if the information has been changed, the stored information in the memory 14 is updated (step S13). The system controller 13 judges whether the target channel is the highest number channel stored in the memory (step S14). If the target channel is not the highest number channel stored in the memory, the target will shift to the next stored channel whose frequency level is higher than the previously selected channel (step S15), and then the procedure returns to step S11. When the target channel is the highest number channel stored in the memory, channel selection search processing is terminated. The program information (the name of a program, the time when a program begins, the broadcasting hours for a program, etc.) required to display an EPG (Electronic Program Guide) may be acquired and stored in an EPG memory in acquiring the digital transmission information.

The second channel search processing enables the change of an enterpriser on a digital channel and the closing of an existent station channel to be known. But an opening of broadcasting on a new channel and the so-called analog broadcasting-to-analog broadcasting conversion (for example, a channel transfers from channel no. 20 to channel no. 30) can not be realized by the above-mentioned second channel search processing. The system controller 13 can encourage a user to issue a command of the first channel search by displaying a message for advising the user to carry out the first channel search for each determined period (every one week, for example) on the screen (OSD) when TV is on for example. Accordingly, the system controller 13 can realize that broadcasting on a new channel is started, for example. Further, the receiver may automatically perform the first channel search for each predetermined period.

The above mentioned second channel search processing can be carried out by operating the digital broadcasting tuner 2B even while the user is viewing the analog broadcasting channel. Information on the digital broadcasting channel can be acquired not only in performing such a channel search but also in receiving a digital broadcasting channel. Another search (re-search) for the stored analog channel may be performed similarly to the second channel search.

As described in the foregoing, according to the present invention, single processing of the first channel search using the analog broadcasting tuner 2A enables not only analog broadcasting channel to be detected but also the existence of digital broadcasting channel to be estimated. Furthermore, the acquisition of information transmitted on a digital broadcasting channel can be made apart from the first channel search when the channel is selected (received) or when the second channel search is performed. As a result, the first channel search (overall channel search) can be efficiently completed in a short time. In the second channel search, the number of physical channels to be searched is decreased by limiting to the number of the estimated channels. Accordingly, overall channel search processing (which also acquires the digital broadcasting information) is efficiently completed in a short time as compared with a case where the digital broadcasting search is carried out on overall physical channel excluding the detected analog broadcasting channel.

The present invention is effective in that both the analog broadcasting channels and the digital broadcasting channels can be efficiently searched in a short time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a broadcasting receiver provided with both an analog broadcasting tuner and a digital broadcasting tuner,
a broadcasting receiver comprising:
a first means for successively selecting channels in the bands for analog broadcasting and digital broadcasting using the analog broadcasting tuner without using the digital broadcasting tuner;
a second means for acquiring an automatic gain controller signal for the selected channel and the existence information on synchronizing signal in a signal outputted from the analog broadcasting tuner for the selected channel;
a third means for storing information for channel selection related to a channel on which the synchronizing signal is detected in the signal outputted from the analog broadcasting tuner, as an analog broadcasting channel in a memory, while storing information for channel selection related to a channel on which the broadcasting wave is detected on the basis of the automatic gain controller signal and the synchronizing signal is not detected in the signal outputted from the analog broadcasting tuner, as a digital broadcasting channel in the memory;
a fourth means for selecting the digital broadcasting channels stored in the memory by using the digital broadcasting tuner;
a fifth means for storing information acquired by receiving each digital broadcasting channel in a memory;
a sixth means for performing a first channel search for distinguishing whether or not a channel is the analog broadcasting channel and presuming whether or not a channel is the digital broadcasting channel by using the first means, the second means and the third means; and
a seventh means for performing a second channel search for acquiring information of the presumed digital broadcasting channel stored in the memory by using the fourth means and the fifth means, said second channel search being performed independently from said first channel search.

2. The broadcasting receiver according to claim 1, wherein
the fourth means successively selects the digital broadcasting channels stored in the memory by using the digital broadcasting tuner.

3. The broadcasting receiver according to claim 2, wherein
a message for suggesting a user to successively select the channels in the bands for analog broadcasting and digital broadcasting using the analog broadcasting tuner is displayed on a screen.

4. The broadcasting receiver according to claim 3, wherein the message is displayed when TV is on.

5. The broadcasting receiver according to claim 3, wherein the message is displayed for each predetermined period.

6. The broadcasting receiver according to claim 2, wherein
a series of processing such as;
successively selecting channels in the bands for analog broadcasting and digital broadcasting using the analog broadcasting tuner;

acquiring an automatic gain controller signal for the selected channel and the existence information on a synchronizing signal for the selected channel; and storing information for channel selection related to a channel on which the synchronizing signal is detected as an analog broadcasting channel in the memory, while storing information for channel selection related to a channel on which the broadcasting wave is detected on the basis of the automatic gain controller signal and the synchronizing signal is not detected as a digital broadcasting channel in the memory;

is automatically performed for each predetermined period.

7. The broadcasting receiver according to claim 2, wherein a series of processing including such processing that the digital broadcasting channel stored in the memory is successively selected by the digital broadcasting tuner, and information acquired by receiving each digital broadcasting channel is stored in the memory can be performed even while the analog broadcasting tuner is in operation.

8. The broadcasting receiver according to claim 1, wherein a message for suggesting a user to successively select the channels in the bands for analog broadcasting and digital broadcasting using the analog broadcasting tuner is displayed on a screen.

9. The broadcasting receiver according to claim 8, wherein the message is displayed when TV is on.

10. The broadcasting receiver according to claim 8, wherein the message is displayed for each predetermined period.

11. The broadcasting receiver according to claim 1, wherein a series of processing such as;

successively selecting channels in the bands for analog broadcasting and digital broadcasting using the analog broadcasting tuner;

acquiring an automatic gain controller signal for the selected channel and the existence information on a synchronizing signal for the selected channel; and storing information for channel selection related to a channel on which the synchronizing signal is detected as an analog broadcasting channel in the memory, while storing information for channel selection related to a channel on which the broadcasting wave is detected on the basis of the automatic gain controller signal and the synchronizing signal is not detected as a digital broadcasting channel in the memory;

is automatically performed for each predetermined period.

* * * * *